(No Model.)

L. SWEET.
BAND CUTTER AND FEEDER.

No. 454,505. Patented June 23, 1891.

Witnesses:
S. A. Bullard
F. B. Polk

Inventor:
Larntine Sweet

UNITED STATES PATENT OFFICE.

LARNTINE SWEET, OF LOAMI, ILLINOIS.

BAND-CUTTER AND FEEDER.

SPECIFICATION forming part of Letters Patent No. 454,505, dated June 23, 1891.

Application filed February 14, 1891. Serial No. 381,491. (No model.)

*To all whom it may concern:*

Be it known that I, LARNTINE SWEET, a citizen of the United States, residing at Loami, in the county of Sangamon, State of Illinois, have invented a new and useful Band-Cutter and Feeder, of which the following is a specification.

This invention relates to improvements in band-cutters and feeders, and has for its object to combine simplicity, cheapness, and durability with practical utility. I attain this object by the construction illustrated in the accompanying drawings, in which—

Figure 1:
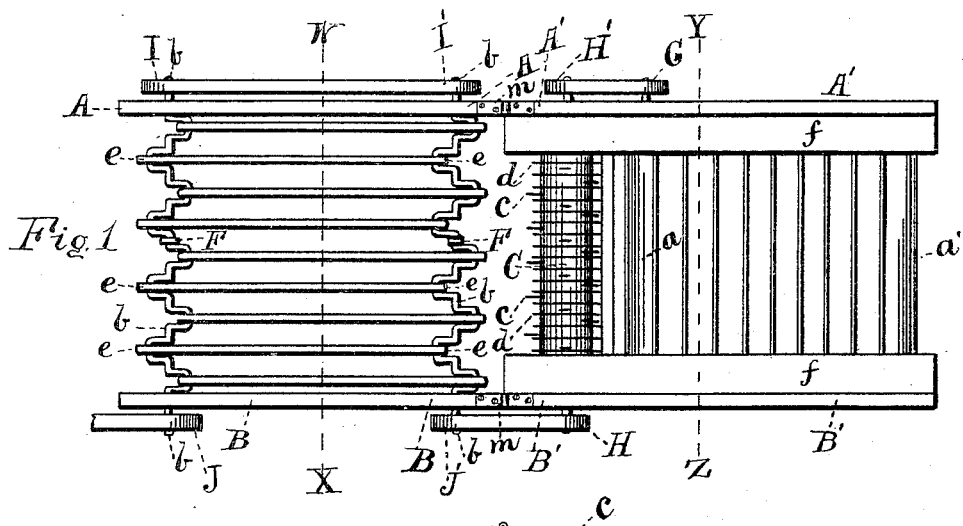
Figure 2:
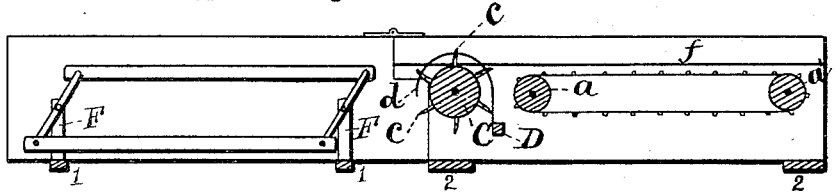
Figure 3:
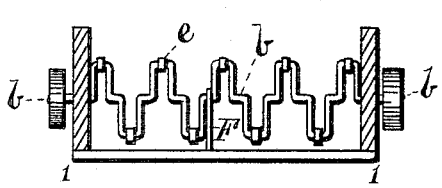
Figure 4:
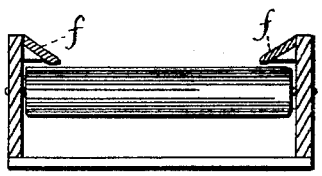

Figure 1 is a perspective view of the combination as adjusted for use. Fig. 2 is a side view of the same, showing relative positions of the different parts; Fig. 3, the feeder, showing shape and action thereof, also the post supporting it in center. Fig. 4 is the carrier.

Similar letters and figures refer to similar parts throughout the several views.

In Fig. 1, W X is the feeder, and Y Z the carrier and cutter. The feeder is made with side pieces A A and B B, joined together on their under side near each end by cross-pieces 1 1, as shown in Figs. 2 and 3. Near each end of W X and immediately above the cross-pieces 1 1 are peculiarly-shaped axle or double-crank shafts $b\ b\ b\ b$, journaled in the sides A A and B B, on each end of which are belt-wheels I I and J J. (Shown in Figs. 1 and 3.) Joined to and connecting these shaker-rods at regular distances from each other are square pieces of timber or metal $e\ e\ e\ e\ e$, which I term "shakers," and which fly up and down, alternating with each other when the machine is put in motion, and which deliver the straw evenly into the mouth of the machine, as shown in Figs. 1 and 3. In the center of these shaker-rods and resting on the cross-pieces 1 1 is a post F, on which the shaker-rod rests, and which prevents it from bending in case of heavy work, as shown in Figs. 2 and 3.

Y Z is the carrier and cutter and made with side pieces A' A' and B' B', joined together on their under side near each end by cross-pieces 2 2, as shown in Fig. 2. The carrier consists of an endless sheet or draper passing over cylinders $a\ a'$, as shown in Figs. 1 and 2, the cylinder $a$ having a band-wheel G, which gives it motion, as shown in Fig. 1. The cutter consists of a cylinder C, with knives $c\ c\ c$, journaled in the sides A' A' and B' B', on each end of which is a band-wheel H and H', substantially as illustrated in Figs. 1 and 2, and a cross-piece D, in which are set teeth or wires $d\ d$, passing over the cylinder C between the knives $c\ c\ c$, as illustrated in Figs. 1 and 2. The end A B of W X is attached to the mouth of the machine at A B. The sides A A B B are hinged to the sides A' A' B' B' at $m$. End Y Z is supported by legs or posts attached at 2 2. The carrier has side pieces $f\ f$, serving to throw the straw to the center and carry it over the cutter in a correct position, substantially as shown in Figs. 1, 2, and 4.

The power that moves the cutter and feeder is carried from the machine to the belt-wheel J, from belt-wheel I (opposite J) to belt-wheel I', from belt-wheel J' (opposite I') to belt-wheel H, and from belt-wheel H' (opposite H) to belt-wheel G, all connected by belts, as shown in Fig. 1. If deemed preferable, the belt-wheels H' and I' may be left off and the wheel G may be run by belt from I to G.

I am aware that prior to my invention band-cutters and feeders have been invented having bent rod giving motion to the shakers. I therefore do not claim such an invention broadly; but What I do claim as my invention, and desire to secure by Letters Patent, is—

A combination of an endless apron for receiving the sheaf, the overshot knife-cylinder at the delivery end of said apron for severing the bands, the bar provided with the wires bending over said cylinder between the knives, and the carrier for loosening out the sheaf, placed just beyond the knife-cylinder and composed of the two double-crank shafts and the shaker-bars, substantially as herein illustrated and described.

LARNTINE SWEET.

Witnesses:
A. G. GLYSSON,
F. B. POLK.